United States Patent
Perry et al.

(10) Patent No.: US 6,754,943 B1
(45) Date of Patent: Jun. 29, 2004

(54) METHOD OF MANUFACTURING AN AXIALLY COLLAPSIBLE DRIVESHAFT ASSEMBLY

(75) Inventors: Daniel C. Perry, Temperance, MI (US); Christopher C. Cheney, Bowling Green, OH (US)

(73) Assignee: Torque-Traction Technologies, Inc., Holland, OH (US)

( * ) Notice: Subject to any disclaimer, the term of this patent is extended or adjusted under 35 U.S.C. 154(b) by 0 days.

(21) Appl. No.: 09/474,693

(22) Filed: Dec. 29, 1999

Related U.S. Application Data
(60) Provisional application No. 60/114,413, filed on Dec. 31, 1998.

(51) Int. Cl.[7] ................................................ B23P 17/00
(52) U.S. Cl. .................................................... 29/421.1
(58) Field of Search ............................... 29/421.1, 525, 29/432.2, 505, 520; 403/459.1; 464/73, 162, 179

(56) References Cited

U.S. PATENT DOCUMENTS

| | | | |
|---|---|---|---|
| 1,779,805 A | | 10/1930 | Dunwoodie |
| 2,199,926 A | | 5/1940 | Swennes |
| 3,293,884 A | | 12/1966 | Grob |
| 3,696,863 A | * | 10/1972 | Kim ............................ 156/179 |
| 3,698,259 A | | 10/1972 | Reeves |
| 4,125,000 A | | 11/1978 | Grob |
| 4,238,540 A | * | 12/1980 | Yates et al. .................... 428/36 |
| 4,451,245 A | * | 5/1984 | Hörnig et al. .............. 464/181 |
| 5,118,214 A | | 6/1992 | Petrzelka et al. |
| 5,222,915 A | | 6/1993 | Petrzelka et al. |
| 5,464,251 A | | 11/1995 | Castellon |
| 5,979,694 A | * | 11/1999 | Bennett et al. ............. 220/611 |

FOREIGN PATENT DOCUMENTS

| GB | 2087770 | * | 6/1982 |
|---|---|---|---|

* cited by examiner

*Primary Examiner*—John C. Hong
(74) *Attorney, Agent, or Firm*—MacMillan, Sobanski & Todd, LLC

(57) ABSTRACT

A method of manufacturing a driveshaft for use in a vehicular drive train system includes the initial step of providing an inner tube including a portion having a plurality of splines formed therein. A portion of an outer tube is then disposed about the portion of the inner tube in an overlapping or telescoping manner, preferably in a press fit relationship. Next, portions of the outer tube are deformed radially inwardly about the inner tube. The radially inwardly deformed portions of the outer tube that extend between the external splines of the inner tube define internal splines on the outer tube. The internal splines formed on the outer tube cooperate with the external splines formed on the inner tube to provide a rotational driving connection between the inner tube and the outer tube, while normally preventing relative axial movement therebetween. However, if a relatively large axial force is applied to the ends of the driveshaft assembly, some or all of the splines will deform, allowing relative axial movement to occur between the inner tube and the outer tube. The splines may extend parallel to the rotational axis of the inner and outer tubes, or alternatively may be tapered relative to the inner tube.

17 Claims, 3 Drawing Sheets

US 6,754,943 B1

METHOD OF MANUFACTURING AN AXIALLY COLLAPSIBLE DRIVESHAFT ASSEMBLY

CROSS REFERENCE TO RELATED APPLICATION

This application claims the benefit of U.S. Provisional Application No. 60/114,413, filed Dec. 31, 1998, the disclosure of which is incorporated herein by reference.

BACKGROUND OF THE INVENTION

This invention relates in general to drive train systems for transferring rotational power from a source of rotational power to a rotatably driven mechanism. In particular, this invention relates to an improved driveshaft assembly for use in such a drive train system that is axially collapsible in the event of a collision to absorb energy and a method for manufacturing same.

Torque transmitting shafts are widely used for transferring rotational power from a source of rotational power to a rotatably driven mechanism. For example, in most land vehicles in use today, a drive train system is provided for transmitting rotational power from an output shaft of an engine/transmission assembly to an input shaft of an axle assembly so as to rotatably drive the wheels of the vehicle. To accomplish this, a typical vehicular drive train system includes a hollow cylindrical driveshaft tube. A first universal joint is connected between the output shaft of the engine/transmission assembly and a first end of the driveshaft tube, while a second universal joint is connected between a second end of the driveshaft tube and the input shaft of the axle assembly. The universal joints provide a rotational driving connection from the output shaft of the engine/transmission assembly through the driveshaft tube to the input shaft of the axle assembly, while accommodating a limited amount of misalignment between the rotational axes of these three shafts.

A recent trend in the development of passenger, sport utility, pickup truck, and other vehicles has been to design the various components of the vehicle in such a manner as to absorb energy during a collision, thereby providing additional safety to the occupants of the vehicle. As a part of this trend, it is known to design the drive train system of vehicles so as to be axially collapsible so as to absorb energy during a collision. To accomplish this, the driveshaft tube may be formed as an assembly of first and second driveshaft sections that are connected together for concurrent rotational movement during normal operation, yet are capable of moving axially relative to one another when a relatively large axially compressive force is applied thereto, such as can occur during a collision. A variety of such axially collapsible driveshaft assemblies are known in the art.

It has been found to be desirable to design axially collapsible driveshaft assemblies of this general type such that a predetermined amount of force is required to initiate the relative axial movement between the two driveshaft sections. It has further been found to be desirable to design these axially collapsible driveshaft assemblies such that a predetermined amount of force (constant in some instances, varying in others) is required to maintain the relative axial movement between the two driveshaft sections. However, it has been found somewhat difficult to accurately control the amount of force that is required to initiate and subsequently maintain the axially collapsing of known driveshaft assemblies. Thus, it would be desirable to provide an improved driveshaft assembly for use in a drive train system that is axially collapsible in the event of a collision to absorb energy and a method for manufacturing same.

SUMMARY OF THE INVENTION

This invention relates to an improved driveshaft assembly for use in a drive train system that is axially collapsible in the event of a collision to absorb energy and a method for manufacturing same. The driveshaft assembly includes an inner tube that is received within an outer tube in an overlapping or telescoping manner. A plurality of external splines are formed on the inner tube, such as by deforming portions of the inner tube radially inwardly. Then, the outer tube is disposed about the inner tube, preferably in a press fit relationship. Next, portions of the outer tube are deformed radially inwardly about the inner tube. The radially inwardly deformed portions of the outer tube that extend between the external splines of the inner tube define internal splines on the outer tube. The internal splines formed on the outer tube cooperate with the external splines formed on the inner tube to provide a rotational driving connection between the inner tube and the outer tube, while normally preventing relative axial movement therebetween. However, if a relatively large axial force is applied to the ends of the driveshaft assembly, some or all of the splines will deform, allowing relative axial movement to occur between the inner tube and the outer tube. The splines may extend parallel to the rotational axis of the inner and outer tubes, or alternatively may be tapered relative to the inner tube.

Various objects and advantages of this invention will become apparent to those skilled in the art from the following detailed description of the preferred embodiments, when read in light of the accompanying drawings.

DETAILED DESCRIPTION OF THE PREFERRED EMBODIMENTS

Figure 1:
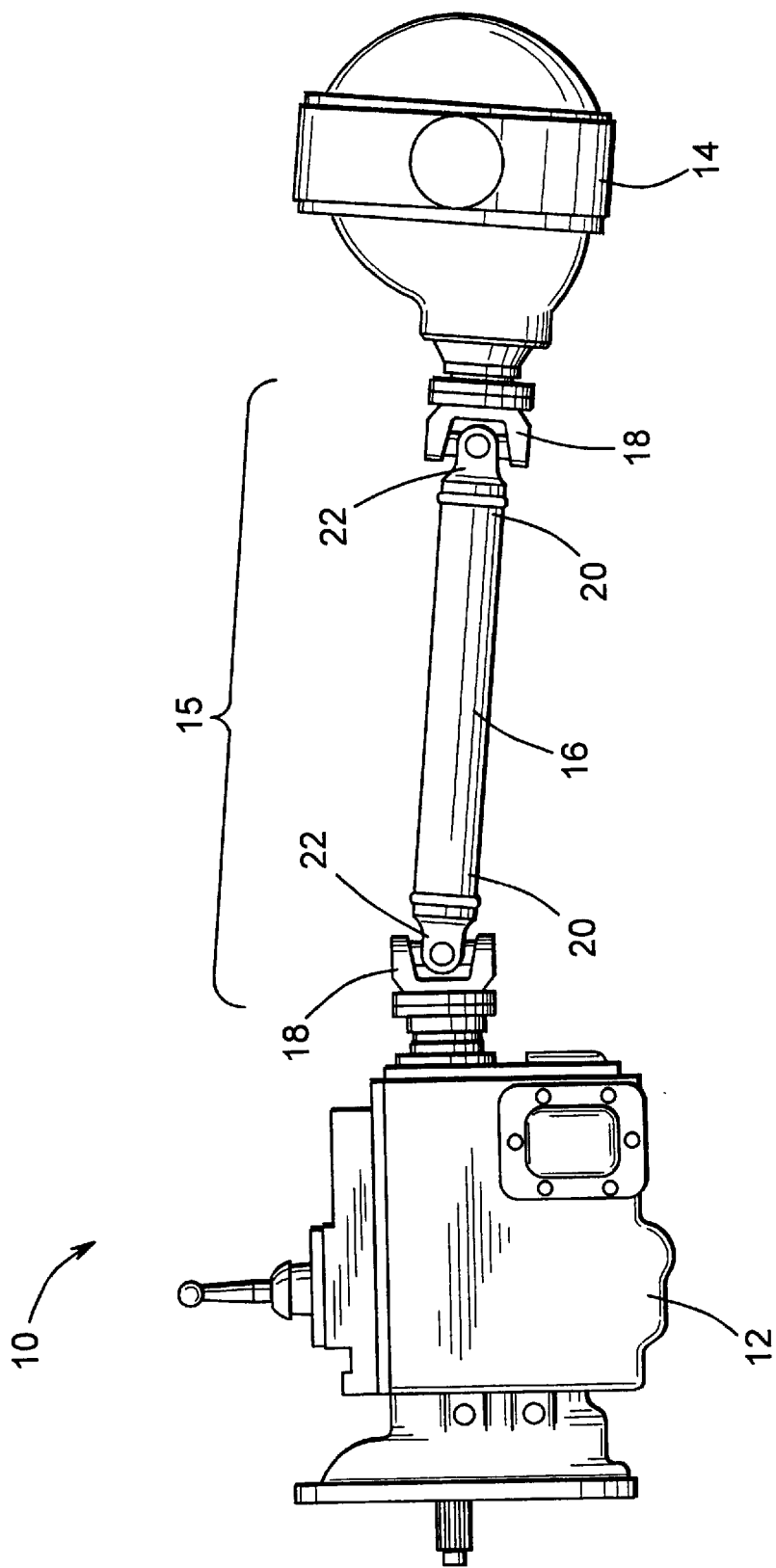
FIG. 1 is a schematic view in elevation of a prior art vehicle drive train assembly.

Referring now to the drawings, there is illustrated in FIG. 1 a vehicle drive train system, indicated generally at 10, that is conventional in the art. The prior art drive train system 10 includes a transmission 12 that is connected to an axle assembly 14 through a driveshaft assembly 15. The driveshaft assembly 15 includes an elongated, cylindrically-shaped driveshaft tube 16. As is typical in conventional vehicle drive train systems 10, the output shaft (not shown) of the transmission 12 and the input shaft (not shown) of the axle assembly 14 are not co-axially aligned. Therefore, universal joints 18 are provided at each end 20 of the driveshaft tube 16 to rotatably connect the driveshaft tube 16 at an angle to the output shaft of the transmission 12 and the input shaft of the axle assembly 14.

The connections between the ends 20 of the driveshaft tube 16 and the universal joints 18 are usually accomplished by a pair of end fittings 22, such as tube yokes or slip yokes. The ends 20 of the driveshaft tube 16 are open and are adapted to receive portions of the end fittings 22 therein. Typically, each end fitting 22 includes a tube seat (not shown) that is inserted into an open end 20 of the driveshaft tube 16. Typically, the end fitting 22 is secured to the driveshaft tube 16 by welding, adhesives, or similar relatively permanent attachment method. Accordingly, torque can be transmitted from the transmission 12 through the first end fitting 22, the driveshaft tube 16, and the second end fitting 22 to the axle assembly 14.

Figure 2:
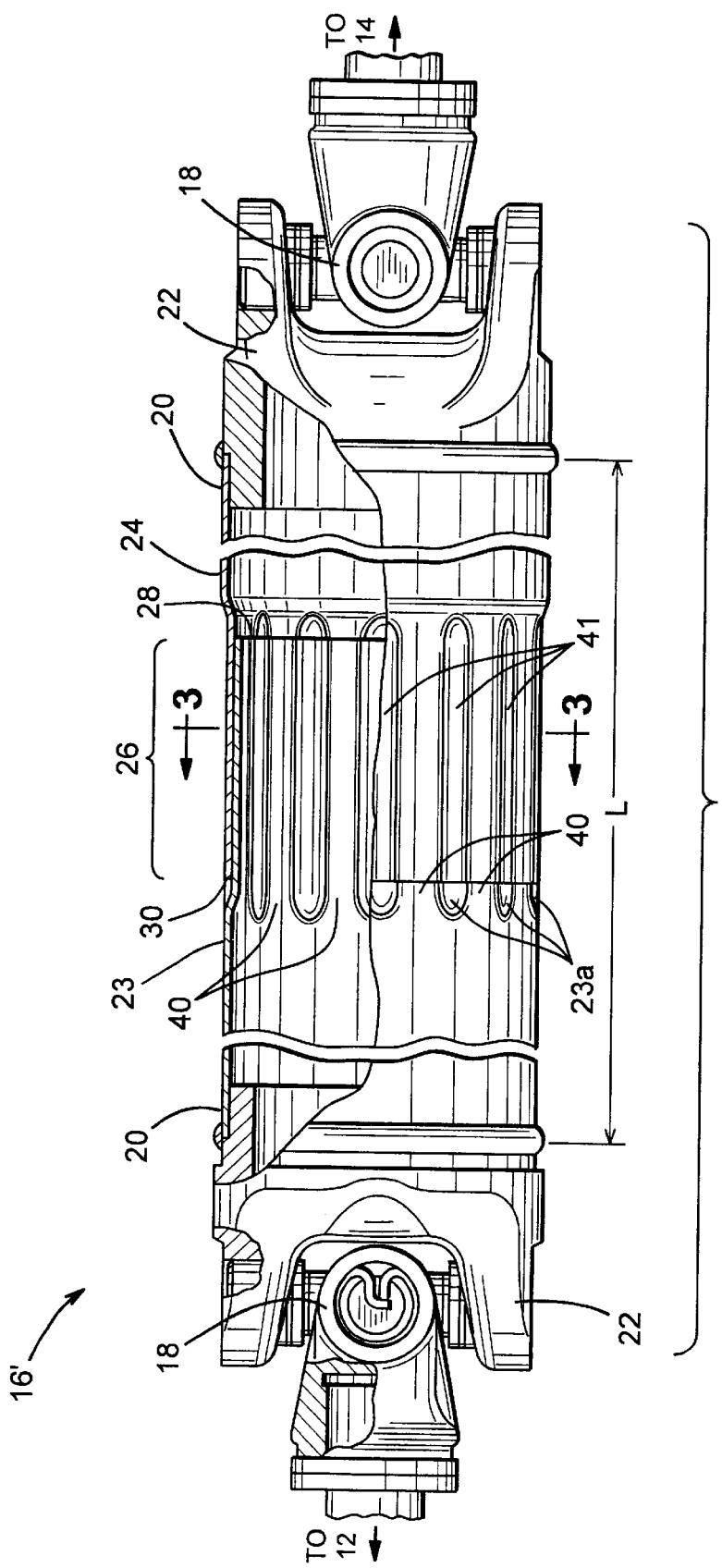
FIG. 2 is an enlarged side elevational view, partially in cross section, of a first embodiment of a vehicle driveshaft assembly in accordance with this invention.

FIG. 2 illustrates an improved structure for a vehicle driveshaft assembly 15' in accordance with this invention. As shown therein, the driveshaft assembly 15' includes a modified driveshaft, indicated generally at 16', that is composed of an inner tube 23 received within an outer tube 24 in an axially overlapping or telescoping manner. In the illustrated embodiment, the inner tube 23 is connected to the front universal joint 18 (i.e. the universal joint 18 that is connected to the output shaft of the transmission 12), while the outer tube 24 is connected to the rear universal joint 18 (i.e. the universal joint 18 that is connected to the input shaft of the axle assembly 14). If desired, however, the inner tube 23 may be connected to the rear universal joint 18, while the outer tube 24 is connected to the front universal joint 18.

The driveshaft 16' is generally hollow and cylindrical in shape, having an axial length L defined by the distance between the two ends 20 thereof. The overall length L of the driveshaft 16' can be varied in accordance with the vehicle in which it is used. For example, in passenger cars, the overall length L of the driveshaft 16' can be relatively short, such as in the range of from about thirty inches to about fifty inches. In pickup trucks or sport utility vehicles, however, the overall length L of the driveshaft 16' can be relatively long, such as in the range of from about sixty inches to about eighty inches. Each of the inner tube 23 and the outer tube 24 extends for a portion of the total axial length L, with a portion of the outer tube 24 and a portion of the inner tube 23 defining an axially overlapped or telescoping region 26. The axial length of the overlapped region 26 can vary as desired.

In the illustrated embodiment, the overlapped region 26 of the inner tube 23 and the outer tube 24 is located closer to the rear universal joint 18, although such is not necessary. Generally, the inner tube 23 and the outer tube 24 are configured such that the location of the overlapped region 26 is at a position along the length of the driveshaft 16' where the desired amount of collapsible axial length will be provided. As shown in FIG. 2, the amount of collapsible axial length can be defined by the distance between a rear end 28 of the inner tube 23 and its adjacent end fitting 22 or the distance between a forward end 30 of the outer tube 24 and its adjacent end fitting 22.

The inner tube 23 and the outer tube 24 of the driveshaft 16' can be formed from any suitable material or combination of materials. Typically, the inner tube 23 and the outer tube 24 of the driveshaft 16' are formed from steel or an aluminum alloy. Other materials, such as fiber reinforced composites or other combinations of metallic or non-metallic materials, may also be used. Preferably, the inner tube 23 and the outer tube 24 of the driveshaft 16' are formed from an aluminum alloy. Suitable methods for individually forming the inner tube 23 and the outer tube 24 of the driveshaft 16' are well known to persons skilled in the art. In the illustrated embodiment, the inner tube 23 and the outer tube 24 of the driveshaft 16' are both formed having a relatively constant outer diameter. However, if desired, either or both of the inner tube 23 and the outer tube 24 of the driveshaft 16' can be formed having a larger diameter center portion, an end portion having a reduced diameter, and a diameter reducing portion positioned between the center and end portions. This type of driveshaft is more fully described in assignee's commonly owned U.S. Pat. Nos. 5,637,042 and 5,643,093, the disclosures of which are hereby incorporated by reference.

To manufacture the driveshaft 16', a plurality of axially extending external splines 40 are initially formed in the inner tube 23. In the illustrated embodiment, portions 23a of the inner tube 23 are initially deformed radially inwardly. The non-deformed regions of the inner tube 23 extending between such radially inwardly deformed portions 23a constitute the external splines 40. Alternatively, portions of the inner tube 23 can be expanded radially outwardly, and those radially expanded portions can constitute the external splines 40. The external splines 40 can be formed in any desired manner, such as by mechanical crimping, electromagnetic pulse forming, hydroforming, and the like. As mentioned above and discussed in further detail below, the shape and size of these external splines 40 will determine the magnitude of the collapse force for the driveshaft 16' according to the invention.

Next, the outer tube 24 is disposed about the inner tube 23, preferably in a press fit relationship. Typically, the outer diameter of the inner tube 23 (as defined by the major diameter of the external splines 40) is only slightly smaller than the inner diameter of the outer tube 24. After fitting the outer tube 24 telescopically over the inner tube 23 in this manner, portions of the outer tube 24 are then deformed radially inwardly about the inner tube 23. Such radially inward deformation of the outer tube 24 can be performed by any desired process, such as by mechanical crimping, electromagnetic pulse forming, hydroforming, and the like. The radially inwardly deformed portions of the outer tube 24 that extend between the external splines 40 of the inner tube 23 define internal splines 41 on the outer tube 24. Thus, the outer tube 24 is conformed around the inner tube 23, thereby forming the complimentary internal splines 41, as best shown in FIG. 3.

The internal splines 41 formed on the outer tube 24 cooperate with the external splines 40 formed on the inner tube 23 to provide a rotational driving connection between the inner tube 23 and the outer tube 24, while normally preventing relative axial movement therebetween. However, if a relatively large axial force is applied to the ends of the driveshaft 16', some or all of the splines 40 and 41 will deform, allowing relative axial movement to occur between the inner tube 23 and the outer tube 24.

Figure 3:
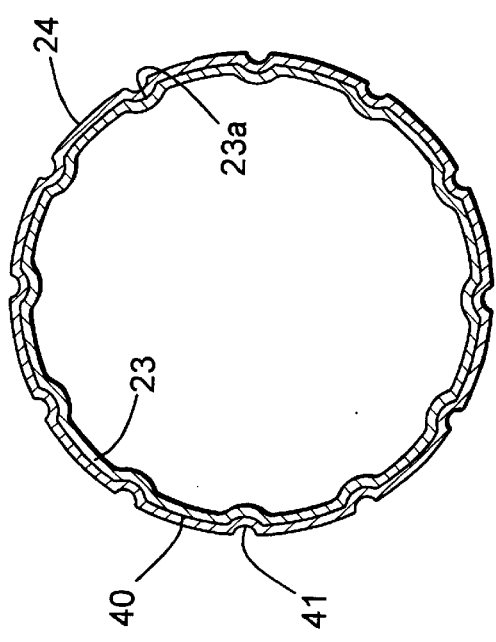
FIG. 3 is a sectional elevational view taken along line 3—3 of FIG. 2.

The splines 40 and 41 may extend around the entire perimeter of the overlapped region 26, as shown in FIG. 3, or around only a portion thereof. Preferably, however, the splines 40 and 41 are formed around the entire perimeter of the overlapped region 26. The number and configuration of the splines 40 and 41 may vary depending upon a number of factors, including the torque requirements of the driveshaft 16', the sizes of the inner tube 23 and the outer tube 24, or the materials chosen for the driveshaft 16'. For example, any number of splines 40 and 41 may be spaced apart around the entire perimeter of the overlapped region 26 or a portion thereof.

In operation, the splines 40 and 41 cooperate to form a mechanical interlock between the inner tube 23 and the outer tube 24 that increases the overall torque carrying capacity of the driveshaft 16'. When a relatively large axial force is applied to the ends of the telescoping driveshaft 16', the inner tube 23 will be forced to move axially within the outer tube 24. Accordingly, the overall length of the driveshaft 16' collapses or shortens, thereby absorbing energy during this process. Typically, appropriately large axial forces are generated during a front-end impact of the vehicle with another object that cause this collapse to occur.

Generally, it is desirable to keep the value of the force which causes collapse of the driveshaft 16' relatively low, i.e. at a value that is only somewhat greater than the axial forces applied during normal vehicle operation. The known designs of collapsible driveshaft tubes designs often require axial forces ranging between about twenty seven thousand pounds to about thirty seven thousand pounds to collapse. In comparison, the axial force required to collapse the telescoping driveshaft 16' of this invention can be about one-half to about one-third of the prior art values, or about ten thousand pounds to about twenty thousand pounds. As such, the telescopic driveshaft assembly 16' of this invention will collapse under lower axial forces, thereby absorbing these axial forces and better protecting the occupants of the vehicle. However, the inner and outer tubes 23 and 24 can be formed to provide any desired amount of force to initiate collapsing.

Figure 4:
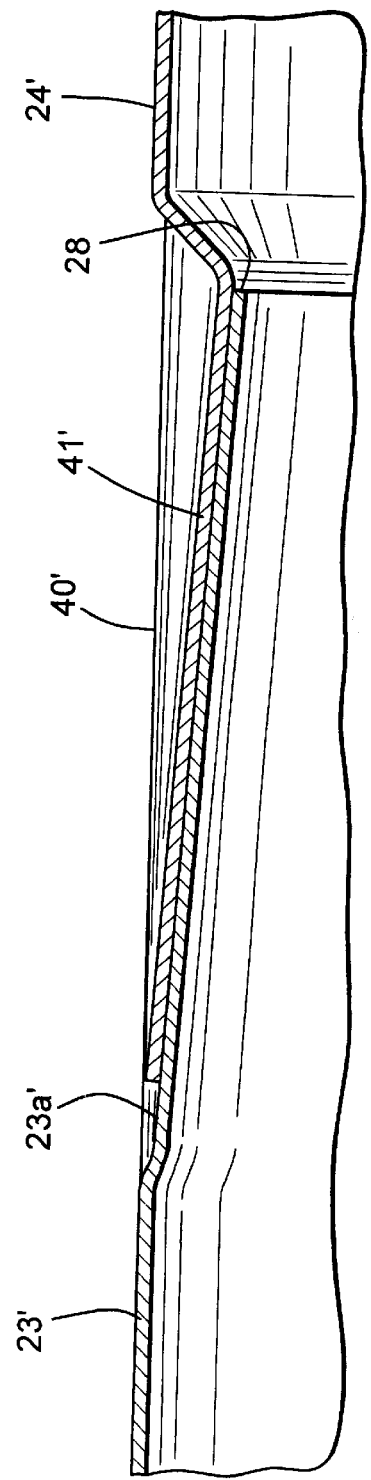
FIG. 4 is an enlarged sectional elevational view of a portion of a second embodiment of a the vehicle driveshaft assembly in accordance with this invention.

The splines 40 may extend parallel to the rotational axis of the inner tube 23, as shown in FIGS. 2 and 3. Alternatively, some or all of the splines 40 may be tapered relative to the rotational axis of the inner tube 23, as shown in FIG. 4. As shown therein, the size of the tapered splines 40' varies along the length of the modified inner tube 23'. In the illustrated embodiment, the tapered splines 40' are formed by varying the depth of the radially inwardly deformed portions 23a' of the inner tube 23' from a greater depth at the end 28' of the inner tube 23' to progressively smaller depths. The splines 40' need not tapered at a uniform angle relative to the inner tube 23'. Rather, as shown in FIG. 4, the magnitude of the taper may vary from a relative small angle, such as provided at the outer end of the spline 40' extending inwardly from the end 28' of the inner tube 23', to a relatively large angle, such as provided at the innermost end of the spline 40'. In such a structure, a relatively small magnitude of the force is required to initiate and maintain the axial collapsing of the inner tube 23' and the outer tube 24' during a first range of movement, but a relatively large magnitude of the force is required to maintain the axial collapsing of the inner tube 23' and the outer tube 24' during a second range of movement. This invention contemplates that the splines 40' and 41' may be formed having any desired combination of longitudinal or tapered portions. The splines 40' may be formed in any desired manner, such as described above. Similarly, the corresponding splines 41' can be formed in the same manner as described above.

Thus, it can be seen that the splines 40' and 41' cooperate in the manner described above to form a mechanical interlock between the inner tube 23' and the outer tube 24'. The tapered shapes of the splines 40' and 41' cause them to function as wedges during axial collapse of the inner tube 23' and the outer tube 24', thereby varying the amount of force required to collapse the tubes 23' and 24' in accordance with the amount of such collapse. These wedge shaped splines 40' and 41' make it possible to provide very fine adjustment in the amount of force required to initiate collapse, the amount of force required to maintain such collapse, and the maximum amount of such collapse.

Although this invention has been described and illustrated in the context of the outer tube 24 being collapsed inwardly into engagement with the inner tube 23 to form the cooperating relationship therebetween, it will be appreciated that the inner tube 23 may be expanded outwardly into engagement with the outer tube 24. In other words, the outer tube 24 may initially be formed having a plurality of internal splines on the inner surface thereof. Then, the inner tube 23 may be disposed telescopically within the outer tube 24 and expanded outwardly into engagement with the outer tube so as to form a cooperating plurality of external splines in the same manner as described above. The only requirement of this invention is that a first one of the tubes is initially formed having a first plurality of splines, and that a second one of the tubes is deformed into engagement with the first one of the tube to form the second plurality of splines.

In summary, this invention uses a "tube within a tube" design to form a telescopic driveshaft tube assembly. Upon impact, the inner tube is forced to move axially within the outer tube. This design allows control of the collapse force of the driveshaft tube during a collision and allows the driveshaft to absorb and dissipate the energy of the impact. This design allows the driveshaft to maintain its co-linear spatial relationship and, thus, maintain clearance between the driveshaft and underbody structures, such as fuel tanks and floor pans.

In order to tailor the load required to collapse the inner and outer tubes, this invention includes the formation of a plurality of splines on the inner tube. During manufacture, the outer tube is press fit onto the inner tube, then deformed about the inner tube to form splines that correspond to the splines on the inner tube. This spline combination provides an excellent interference fit or mechanical interlock between the inner and outer tubes. This restricts axial motion and permits good transmission of torque during operation, thereby eliminating any play between the inner and outer tubes that could be a source of residual wobble and vibration. By varying the number of the splines as well as their shape, the load required to telescope the inner and outer tubes together can be tailored to different vehicle requirements.

The cooperation of the splines allows for the transmission of the torque and rotary motion necessary for driveshaft operation, wherein the inner and outer tubes remain in the same axial position during normal operation of the driveshaft. However, in the event of a collision, a large axial force is applied to the ends of the driveshaft assembly. As a result, the inner tube and the outer tube move telescopically relative to one another. The amount of force required to cause such telescopic movement can be adjusted by varying the size and shape of the splines on the inner tube and the outer tube.

The splines on the inner tube may be inclined toward the desired direction of collapse of the driveshaft. In effect, the plurality of splines forms a wedge. The angle of inclination of this wedge can be determinative of the amount of force required to initiate or maintain collapse the driveshaft. The radial deformation of the outer tube around the inclined splines of the inner tube results in the formation of complimentary wedge-shaped splines in the outer tube. As the driveshaft collapses in a crash, the wedge shaped splines on the outer tube ride up the wedge shaped splines on the inner tube. The overall diameter of the splines on the inner tube is initially only slightly greater than the diameter of the inner tube itself and progresses gradually, thereby increasing the overall radial interference and the load to collapse as is necessary for the application.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

What is claimed is:

1. A method of manufacturing a driveshaft comprising the steps of:
   (a) providing a first tube formed from a metallic material including an end having a plurality of splines provided therein;
   (b) providing a second tube formed from a metallic material including an end;
   (c) disposing the end of the first tube in an axially overlapping relationship relative to the end of the second tube; and
   (d) subsequent to step (c), re-shaping the end of the second tube into engagement with the plurality of splines formed in the end of the first tube so as to form a plurality of splines in the end of the second tube that cooperate with the plurality of splines formed in the end of the first tube.

2. The method defined in claim 1 wherein said step (a) is performed by providing an inner tube including an end having a plurality of splines provided therein; said step (b) is performed by providing an outer tube including an end; said step (c) is performed by disposing the end of the inner tube in an axially overlapping relationship within the end of the outer tube; and said step (d) is performed by re-shaping the end of the outer tube inwardly into engagement with the plurality of splines formed in the end of the inner tube.

3. The method defined in claim 1 wherein said step (a) is performed by providing an outer tube including an end having a plurality of splines provided therein; said step (b) is performed by providing an inner tube including an end; said step (c) is performed by disposing the end of the outer tube in an axially overlapping relationship about the end of the inner tube; and said step (d) is performed by re-shaping the end of the inner tube outwardly into engagement with the plurality of splines formed in the end of the outer tube.

4. The method defined in claim 1 wherein said step (a) is performed by providing a first tube including an end having a plurality of splines provided therein that extend parallel to a rotational axis of the first tube.

5. The method defined in claim 1 wherein said step (a) is performed by providing a first tube including an end having a plurality of splines provided therein that are tapered relative to a rotational axis of the first tube.

6. The method defined in claim 5 wherein said step (a) is performed by providing a first tube including an end having a plurality of tapered splines provided therein that extend at a constant angle relative to the rotational axis of the first tube.

7. The method defined in claim 5 wherein said step (a) is performed by providing a first tube including an end having a plurality of tapered splines provided therein that extend at a varying angle relative to the rotational axis of the first tube.

8. The method defined in claim 1 wherein said step (c) is performed by disposing the end of the first tube in an axially overlapping and press fit relationship relative to the end of the second tube.

9. The method defined in claim 1 wherein said step (a) is performed by (1) providing a first tube that is generally hollow and cylindrical in shape and (2) re-shaping the end of the first tube to provide the plurality of splines.

10. The method defined in claim 9 wherein said step (a)(2) is performed by mechanical deformation.

11. The method defined in claim 9 wherein said step (a)(2) is performed by crimping.

12. The method defined in claim 9 wherein said step (a)(2) is performed by electromagnetic pulse deformation.

13. The method defined in claim 9 wherein said step (a)(2) is performed by hydroforming.

14. The method defined in claim 9 wherein said step (d) is performed by mechanical deformation.

15. The method defined in claim 9 wherein said step (d) is performed by crimping.

16. The method defined in claim 9 wherein said step (d) is performed by electromagnetic pulse deformation.

17. The method defined in claim 9 wherein said step (d) is performed by hydroforming.

* * * * *